US012682850B2

(12) United States Patent
Liang

(10) Patent No.: US 12,682,850 B2
(45) Date of Patent: Jul. 14, 2026

(54) DISPLAY DRIVING METHOD AND MODULE FOR TOUCH DISPLAY PANEL, AND TOUCH DISPLAY APPARATUS

(71) Applicants:Wuhan Tianma Microelectronics Co., Ltd. Shanghai Branch, Shanghai (CN); Wuhan Tianma Microelectronics Co., Ltd., Wuhan (CN)

(72) Inventor: Xiaozhong Liang, Shanghai (CN)

(73) Assignees: Wuhan Tianma Microelectronics Co., Ltd. Shanghai Branch, Shanghai (CN); Wuhan Tianma Microelectronics Co., Ltd., Wuhan (CN)

( * ) Notice: Subject to any disclaimer, the term of this patent is extended or adjusted under 35 U.S.C. 154(b) by 0 days.

(21) Appl. No.: 19/088,906

(22) Filed: Mar. 24, 2025

(65) Prior Publication Data

US 2025/0225933 A1     Jul. 10, 2025

(30) Foreign Application Priority Data

Apr. 15, 2024    (CN) .......................... 202410451748.7

(51) Int. Cl.
| | |
|---|---|
| *G09G 3/3233* | (2016.01) |
| *G06F 3/041* | (2006.01) |
| *G06F 3/044* | (2006.01) |
| *G06V 40/13* | (2022.01) |

(52) U.S. Cl.
CPC ......... *G09G 3/3233* (2013.01); *G06F 3/0412* (2013.01); *G06F 3/0416* (2013.01); *G06F 3/0446* (2019.05); *G06V 40/1306* (2022.01);

*G09G 2300/0842* (2013.01); *G09G 2320/02* (2013.01); *G09G 2320/0626* (2013.01); *G09G 2320/0686* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 2018/0113501 A1* | 4/2018 | Iwaki | .................... | G06F 3/0412 |
| 2018/0114047 A1* | 4/2018 | Kim | ........................ | G06F 21/32 |
| 2019/0005871 A1* | 1/2019 | Zhao | .................... | G09G 3/3208 |
| 2022/0051617 A1* | 2/2022 | Hwang | ................. | G06F 1/3265 |

FOREIGN PATENT DOCUMENTS

| | | | | |
|---|---|---|---|---|
| CN | 104360775 A | * | 2/2015 | ............. G06F 3/044 |
| CN | 112650410 A | * | 4/2021 | ........... G06F 3/0416 |

* cited by examiner

*Primary Examiner* — Christopher R Lamb
(74) *Attorney, Agent, or Firm* — Wiersch Law Group

(57) ABSTRACT

Embodiments of the present application provide a display driving method and module for a touch display panel, and a touch display apparatus, and relate to the field of display technologies. The present disclosure is used to improve display performance of the touch display panel. The display driving method for the touch display panel includes: acquiring position information of a touch region according to a touch operation, the touch operation acting on the touch region; receiving image data; and adjusting actual display brightness of the touch region according to the position information of the touch region and the image data.

18 Claims, 14 Drawing Sheets

112/11

111/11

Acquiring position information of a non-touch region    S4

Allowing the non-touch region to display according to standard display luminance corresponding to received image data    S5

DISPLAY DRIVING METHOD AND MODULE FOR TOUCH DISPLAY PANEL, AND TOUCH DISPLAY APPARATUS

CROSS REFERENCE TO RELATED APPLICATIONS

The present application claims priority to Chinese Application No. CN 202410451748.7, filed on Apr. 15, 2024, the content of which is incorporated herein by reference in its entirety.

TECHNICAL FIELD

The present disclosure relates to the field of display technologies, and in particular to a display driving method and module for a touch display panel, and a touch display apparatus.

BACKGROUND

In recent years, the touch technology has been widely applied to daily work and life. A user can directly contact a touch display screen with a touch object such as a hand or a stylus pen to input information. This can make the user less dependent on other input devices (such as a keyboard and a mouse), and improves human-machine interaction performance.

In response to a touch operation on the touch display panel, there are a touch region and a non-touch region in the touch display panel according to whether the touch operation occurs. At present, in response to display driving on the touch display panel, both the touch region and the non-touch region are subjected to the display driving uniformly according to received image data. This driving method does not consider influences of the touch operation on display of the touch region, which is not conducive to the improvement of display performance.

SUMMARY

In view of this, embodiments of the present disclosure provide a display driving method and module for a touch display panel, and a touch display apparatus. The present disclosure can adjust actual display brightness of a touch region according position information of the touch region and image data, can associate the actual display brightness of the touch region with a touch operation, and improves display performance of the touch display panel.

According to a first aspect, an embodiment of the present disclosure provides a display driving method for a touch display panel, including:

acquiring position information of a touch region according to a touch operation, the touch operation acting on the touch region;

receiving image data; and adjusting actual display brightness of the touch region according to the position information of the touch region and the image data.

According to a second aspect, an embodiment of the present disclosure provides a display driving module for a touch display panel, including a touch driver and a display driver.

The touch driver is configured to acquire position information of a touch region according to a touch operation, the touch operation acting on the touch region.

The display driver is configured to receive image data, and adjust actual display brightness of the touch region according to the position information of the touch region and the image data.

According to a third aspect, an embodiment of the present disclosure provides a touch display apparatus, including a touch display panel and the above display driving module. The display driving module is electrically connected to the touch display panel.

According to the display driving method and module for a touch display panel, and the touch display apparatus provided by the embodiments of the present disclosure, in response to display driving on the touch display panel, position information of a touch region is acquired. Then actual display brightness of the touch region is adjusted according to the position information of the touch region and received image data. Therefore, the present disclosure can associate actual display brightness of a display region with image data received by the display region and whether the touch operation occurs in the region at present, and improves display performance of the touch display panel.

BRIEF DESCRIPTION OF DRAWINGS

To describe the technical solutions in the embodiments of the present application more clearly, the drawings required for describing the embodiments are briefly described below. Apparently, the drawings in the following description show merely some embodiments of the present application, and those of ordinary skill in the art may still derive other drawings from these drawings without creative efforts.

DESCRIPTION OF EMBODIMENTS

For a better understanding of the technical solutions of the present application, the following describes in detail the embodiments of the present application with reference to the accompanying drawings.

It should be noted that the described embodiments are merely some, but not all, embodiments of the present application. Based on the embodiments of the present application, all other embodiments obtained by those of ordinary skill in the art without creative efforts fall within the protection scope of the present application.

Terms in the embodiments of the present application are merely used to describe the specific embodiments, and are not intended to limit the present application. Unless otherwise specified in the context, words, such as "a", "the", and "this", in a singular form in the embodiments and appended claims of the present application include plural forms.

It should be understood that the term "and/or" in this specification merely describes associations between associated objects, and it indicates three types of relationships. For example, A and/or B may indicate that A exists alone, A and B coexist, or B exists alone. In addition, the character "/" in this specification generally indicates that the associated objects are in an "or" relationship.

Figure 1:
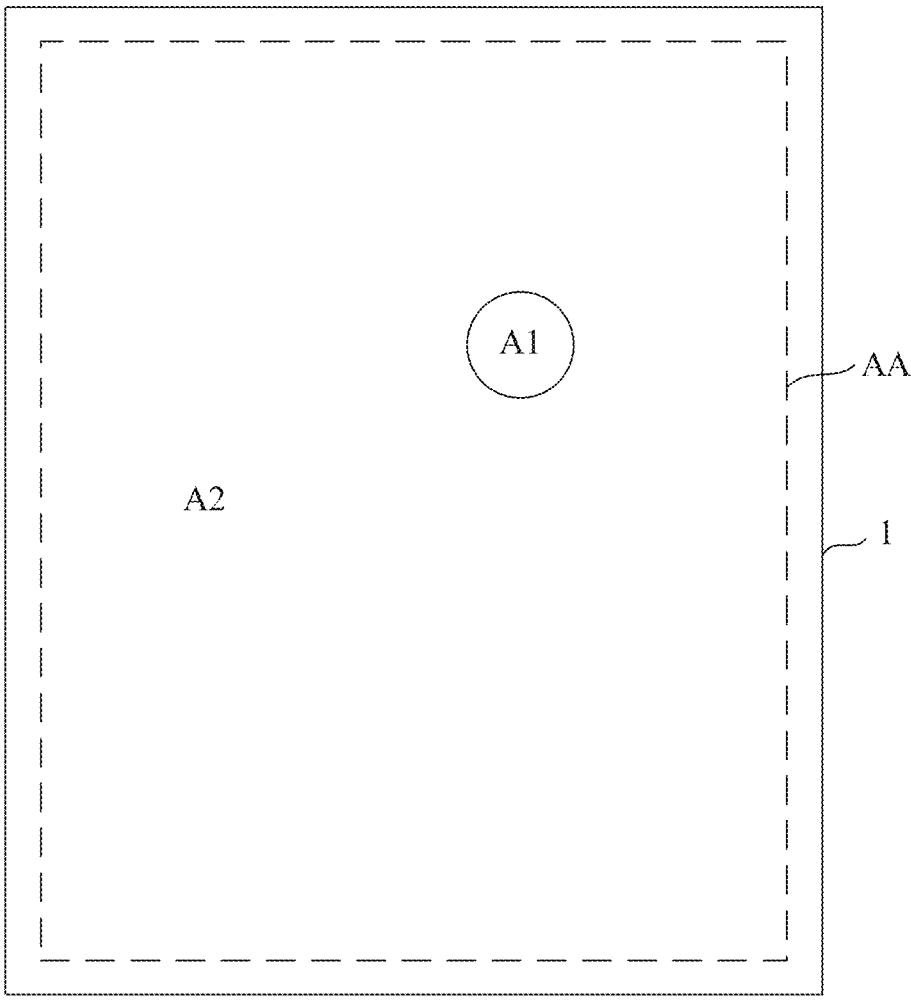
FIG. 1 is a schematic view of a touch display panel according to an embodiment of the present disclosure.

An embodiment of the present disclosure provides a display driving method for a touch display panel. FIG. 1 is a schematic view of a touch display panel according to an embodiment of the present disclosure. As shown in FIG. 1, the touch display panel 1 includes a display region AA. The display region AA includes a plurality of pixel units (not shown). In the embodiment of the present disclosure, at least a part of the display region AA further includes a touch electrode. That is, at least a part of the display region AA may be multiplexed as a touch region. For example, a touch object such as a finger or a stylus pen can press a surface of the display region AA to perform a touch operation on the touch display panel 1.

Figure 2:
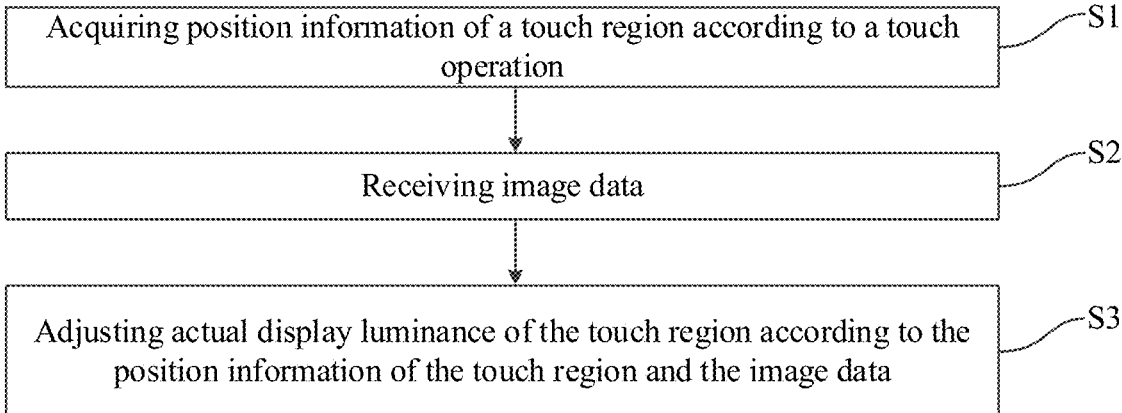
FIG. 2 illustrates a flowchart of a display driving method for a touch display panel according to an embodiment of the present disclosure.
Figure 3:
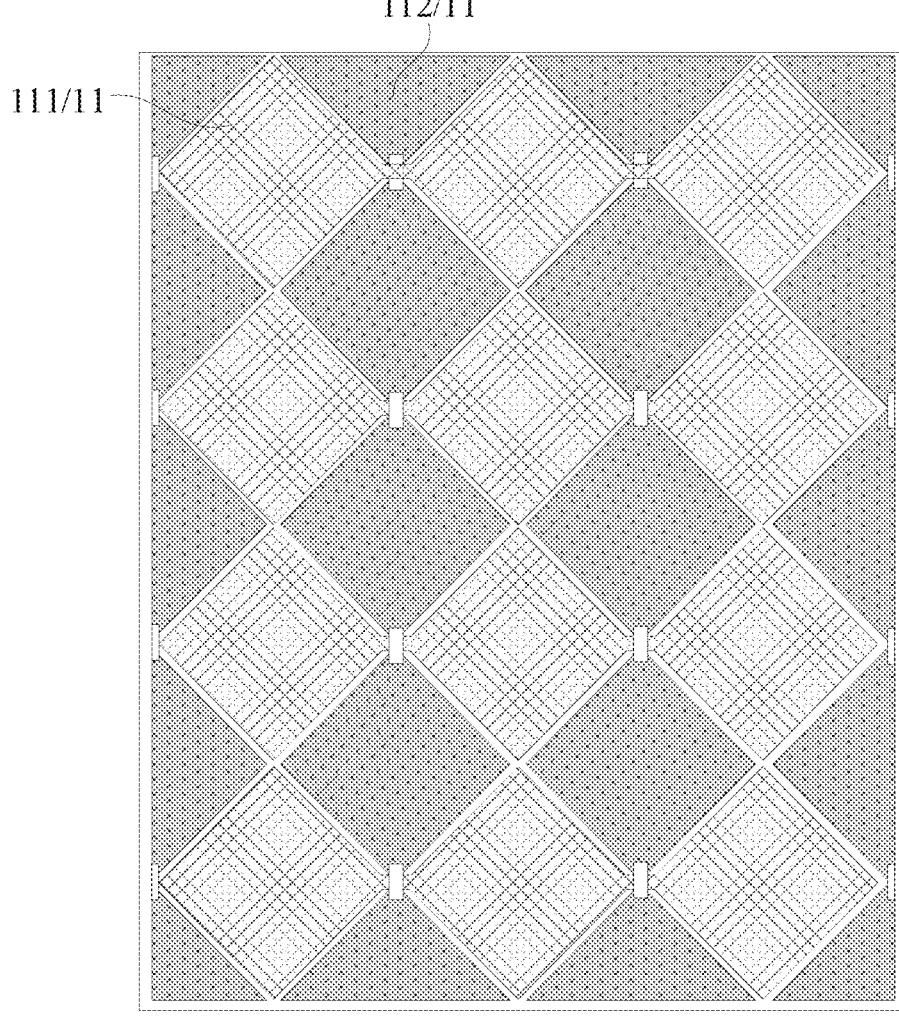
FIG. 3 illustrates a distribution of a touch electrode according to an embodiment of the present disclosure.

FIG. 2 illustrates a flowchart of a display driving method for a touch display panel according to an embodiment of the present disclosure. As shown in FIG. 2, in response to display driving on the touch display panel, the display driving method includes:

In step S1, position information of a touch region A1 is acquired according to a touch operation. The touch region A1 is a region where the touch operation occurs in a display region AA of the touch display panel 1. Exemplarily, the touch display panel 1 may use a self-capacitive touch mode or a mutual capacitive touch mode. FIG. 3 illustrates a distribution of a touch electrode according to an embodiment of the present disclosure. As shown in FIG. 3, with the mutual capacitive touch mode as an example, the touch electrode 11 includes a plurality of touch driving electrodes 111 and a plurality of touch sensing electrodes 112. The plurality of touch driving electrodes 111 and the plurality of touch sensing electrodes 112 are insulated from each other and intersect with each other to form a plurality of intersections uniformly distributed on the touch display panel 1. The touch driving electrodes 111 and the touch sensing electrodes 112 form capacitors at the intersections. Exemplarily, in response to the touch driving on the touch display panel 1, the touch driving electrodes 111 are scanned respectively in sequence. Meanwhile, through a sensing signal output by each of the touch sensing electrodes 112, a capacitance at each intersection is sensed. When the touch object such as the finger or the stylus pen contacts the touch display panel, a capacitance is generated between the touch object and the touch sensing electrode 112, such that a capacitance at a touch position between the touch driving electrode 111 and the touch sensing electrode 112 is changed. By detecting a change of the capacitance at the intersection, the position information of the touch region A1 can be determined.

In step S2, image data is received. Exemplarily, the pixel units include a first color sub-pixel, a second color sub-pixel, and a third color sub-pixel. The image data includes first color image data corresponding to the first color sub-pixel, second color image data corresponding to the second color sub-pixel, and third color image data corresponding to the third color sub-pixel. In response to the touch driving on the touch display panel 1, a data voltage provided for a corresponding sub-pixel may be generated based on the image data.

In step S3, actual display brightness $L_{11}$ of the touch region A1 is adjusted according to the position information of the touch region A1 and the image data. Exemplarily, in the embodiment of the present disclosure, the actual display brightness $L_{11}$ of the touch region A1 may be different from standard display brightness $L_{21}$ corresponding to image data received by the touch region A1. For example, the actual display brightness $L_{11}$ may be greater than the standard display brightness $L_{21}$. Alternatively, the actual display brightness $L_{11}$ may be less than the standard display brightness $L_{21}$. The standard display brightness $L_{21}$ is associated with brightness of a picture to be displayed by the touch display panel 1. For example, the standard display brightness $L_{21}$ is the brightness of the picture to be displayed. The picture to be displayed corresponds to the image data received by the touch display panel 1. Different image data may correspond to different standard display brightness $L_{21}$.

It is to be noted that FIG. 2 in which the step S1 is executed first and then the step S2 is executed is merely for schematic illustration. A sequence for executing the step S1 and the step S2 is not defined in the embodiment of the present disclosure. For example, the step S2 may be executed first, and then the step S1 is executed. Alternatively, the step S1 and the step S2 may also be executed at the same time.

To light up the pixel units in the display region AA of the touch display panel 1, namely in response to the display driving on the touch display panel 1, when the touch object such as the finger or the stylus pen presses the display region of the touch display panel 1, the position information of the touch region A1 is acquired, namely position information of a region where the touch operation occurs at present in the display region AA is acquired. Actual display brightness $L_{11}$ of the touch region A1 is adjusted according to the position information of the touch region A1 and the received image data. The present disclosure associates the actual display brightness of the display region AA not only with the received image data, but also with whether the touch operation occurs in the region at present, and which is conducive to improve display performance of the touch display panel.

In a related art, in response to display driving on the touch display panel 1, the display driving is performed only according to image data received by the display region AA, without considering whether a touch operation occurs in the display region AA at present. Generally, in actual application, the touch object is non-transparent. Hence, in response to the touch operation on the touch display panel 1, the touch region A1 is obstructed by the touch object, such that light emit from the sub-pixels in the touch region A1 is obstructed by the touch object. In other words, in response to the touch operation on the touch display panel, a display picture of the touch region A1 is an unnecessary display region unperceived by the user. Therefore, in the embodiment of the present disclosure, the actual display brightness $L_{11}$ of the touch region A1 may be reduced relative to the standard display brightness $L_{21}$. Compared with a case where the actual display brightness of the touch region A1 is not reduced, not only can the display picture of the touch display panel 1 perceived by the user not be affected, but also the display power consumption of the touch region A1 can be reduced, thereby making the touch display panel 1 more competitive.

Alternatively, in other application scenarios, for example, under the case that the touch object has a certain light transmittance, the actual display brightness $L_{11}$ of the touch region A1 may be increased relative to the standard display brightness $L_{21}$ in the embodiment of the present disclosure. When the user performs a touch operation on the touch display panel 1 and observes a display picture of the touch display panel 1, due to the larger actual display brightness $L_{11}$ of the touch region A1 where the touch operation occurs, after light emit by the pixel units in the touch region A1 passes through the touch object, an intensity of light of the touch region A1 entering eyes of the user is the same as an intensity of light emit by the pixel units in the non-touch region A2 where the touch operation does not occur. A region out of the touch region A1 in the display region AA is called the non-touch region A2. That is, an influence of obstruction of the touch object on the display brightness in the touch region A1 can be compensated, such that the brightness of the touch region A1 observed by the user is the same as the brightness of the non-touch region A2 where the touch operation does not occur. This makes the touch display panel display more uniformly.

In the embodiment of the present disclosure, after the touch object such as the finger or the stylus pen is removed from the surface of the touch display panel 1, namely upon completion of the touch operation, in response to the display driving on the touch display panel 1, the region is lighted up according to the standard display brightness $L_{21}$ corresponding to the received image data.

Exemplarily, prior to the position information of the touch region A1 is acquired in the step S1, the display driving method provided by the embodiment of the present disclosure further includes:

In step S0, whether the touch operation occurs on the touch display panel 1 is determined. Exemplarily, whether the touch operation occurs on the touch display panel 1 may be determined according to a touch signal transmitted by the touch electrode in the embodiment of the present disclosure.

If yes, the step S1 is executed. That is, the position information of the touch region A1 is acquired.

If no, the touch display panel 1 displays according to standard display brightness $L_2$ corresponding to received image data, such that each region in the display region AA of the touch display panel 1 can display normally.

Optionally, the actual display brightness Lu is less than the standard display brightness $L_{21}$. When the touch object is non-transparent, the actual display brightness $L_{11}$ of the touch region A1 is reduced relative to the standard display brightness $L_{21}$ in the embodiment of the present disclosure. Compared with a case where the actual display brightness of the touch region A1 is not reduced, not only can the display picture of the touch display panel 1 perceived by the user not be affected, but also the display power consumption of the touch region A1 can be reduced, thereby making the touch display panel 1 more competitive.

Optionally, the touch region A1 may be provided as a black picture in the embodiment of the present disclosure, so as to minimize driving power consumption of the touch display panel 1.

Figure 4:
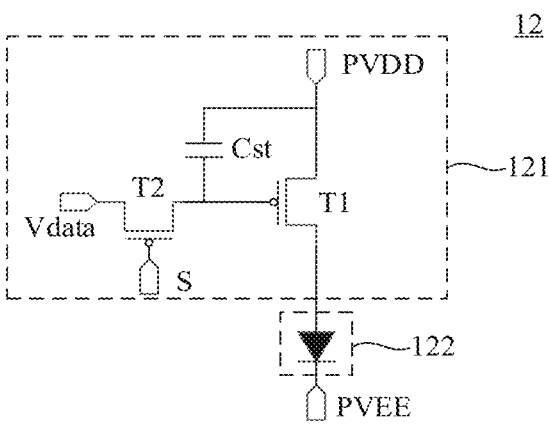
FIG. 4 is an equivalent circuit diagram of a sub-pixel according to an embodiment of the present disclosure.

FIG. 4 is an equivalent circuit diagram of a sub-pixel according to an embodiment of the present disclosure. Exemplarily, as shown in FIG. 4, the sub-pixel 12 includes a pixel driver circuit 121 and a light emitting component 122 that are electrically connected. The pixel driver circuit 121 includes a data writing terminal Vdata, a scanning voltage terminal S, a first power voltage terminal PVDD, a second power voltage terminal PVEE, a first transistor T1, a second transistor T2, and a memory capacitor Cst. A gate of the first transistor T1 is electrically connected to a second electrode of the memory capacitor Cst, a first electrode of the first transistor T1 is electrically connected to the first power voltage terminal PVDD, and a second electrode of the first transistor T1 is electrically connected to an anode of the light emitting component 122. A gate of the second transistor T2 is electrically connected to the scanning voltage terminal S, a first electrode of the second transistor T2 is electrically connected to the data writing terminal Vdata, and a second electrode of the second transistor T2 is electrically connected to the second electrode of the memory capacitor Cst. A first electrode of the memory capacitor Cst is electrically connected to the first power voltage terminal PVDD, and the second electrode of the memory capacitor Cst is electrically connected to the gate of the first transistor T1. The anode of the light emitting component 122 is electrically connected to the second electrode of the first transistor T1. A cathode of the light emitting component 122 is electrically connected to the second power voltage terminal PVEE.

Exemplarily, the light emitting component 122 includes any one of an organic light emitting diode (OLED), a quantum dots LED (QLED), and a micro-LED. During a light emitting period of the light emitting component 122, a first power voltage applied to the first power voltage terminal PVDD may be greater than a second power voltage applied to the second power voltage terminal PVEE.

In response to the display driving on the touch display panel, a scanning signal for conducting a level is applied to the scanning voltage terminal S, such that the second transistor T2 is turned on. A data voltage transmitted by the data writing terminal Vdata is written and stored into the memory capacitor Cst. The first transistor T1 is turned on to form a current conducting path from the first power voltage terminal PVDD, the first transistor T1 and the light emitting component 122 to the second power voltage terminal PVEE, such that the light emitting component 122 emits light.

Optionally, that the actual display brightness $L_{11}$ of the touch region A1 is adjusted in the step S2 includes: A data voltage of the touch region A1 is adjusted to an actual data voltage $V_1$. The actual data voltage $V_1$ is not equal to a standard data voltage $V_2$ corresponding to the image data. In the embodiment of the present disclosure, a current flowing through the light emitting component 122 is associated with the data voltage written by the data writing terminal Vdata. In the embodiment of the present disclosure, adjusting the data voltage can affect a driving current flowing through the light emitting component 122, thereby adjusting brightness of the light emitting component 122. This is simple and easily achievable. While the data voltage in the touch region A1 is adjusted, a data voltage received by the pixel driver circuit 121 in the non-touch region A2 cannot be affected, ensuring that the non-touch region A2 can display according to the standard display brightness.

It is to be noted that the structure of the pixel driver circuit 121 in FIG. 4 is merely for schematic illustration, and the structure of the pixel driver circuit 121 can be adjusted according to different design demands in the embodiment of the present disclosure. For example, other numbers of pixel driver circuits 121 may be provided. In addition, the first transistor T1 and the second transistor T2 in FIG. 4 are a P-type transistor, which is also merely for schematic illustration. One of the first transistor T1 and the second transistor T2 may be provided by those skilled in the art according to the need as including an N-type transistor, which is not defined thereto in the embodiment of the present disclosure.

Exemplarily, a voltage difference $\Delta V$ exists between the actual data voltage $V_1$ and the standard data voltage $V_2$, namely $\Delta V = V_2 - V_1$.

Figure 5:
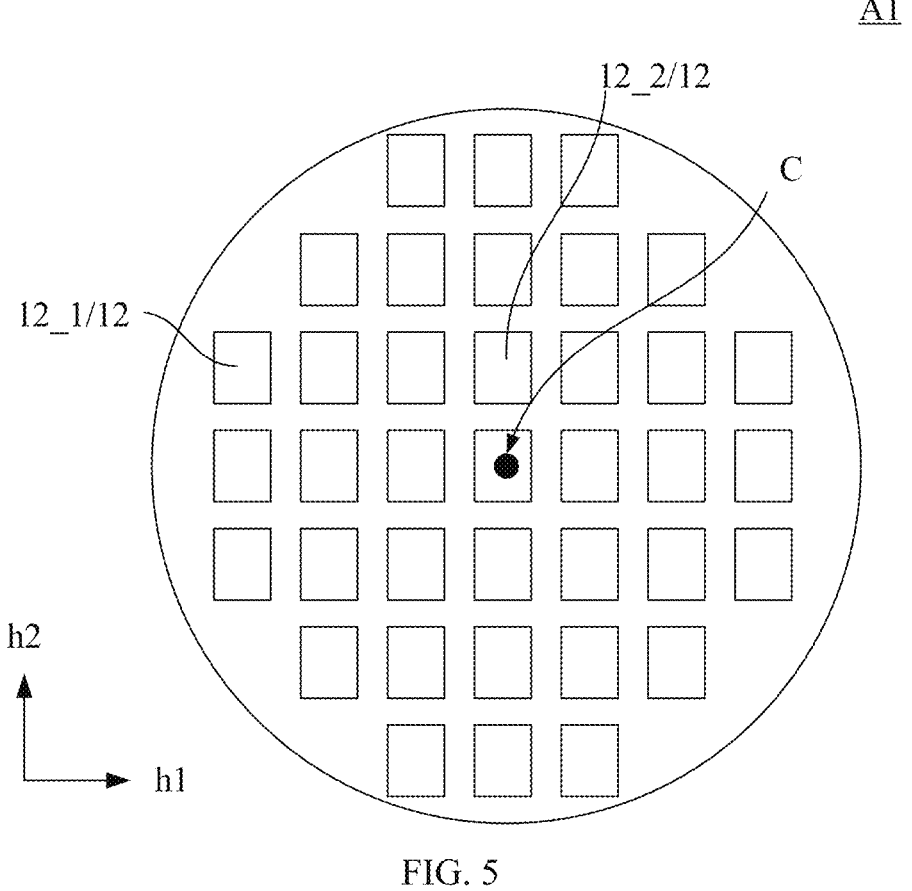
FIG. 5 is a schematic view of a touch region according to an embodiment of the present disclosure.

FIG. 5 is a schematic view of a touch region according to an embodiment of the present disclosure. As shown in FIG. 5, the touch region A1 includes a plurality of sub-pixels 12. Optionally, the plurality of sub-pixels 12 are arranged in an array along a first direction h1 and a second direction h2. In the embodiment of the present disclosure, the plurality of sub-pixels 12 include a first sub-pixel 12_1 and a second sub-pixel 12_2. A distance from the first sub-pixel 12_1 to a geometric center C of the touch region A1 is greater than a distance from the second sub-pixel 12_2 to the geometric center C of the touch region A1.

That the data voltage in the touch region A1 is adjusted to the actual data voltage $V_1$ in the step S3 includes: A voltage difference corresponding to the first sub-pixel 12_1 is controlled to be less than a voltage difference corresponding to the second sub-pixel 12_2. The voltage difference corresponding to the sub-pixel 12 refers to the voltage difference between the actual data voltage $V_1$ received by the sub-pixel 12 and the standard data voltage $V_2$.

In the embodiment of the present disclosure, when the touch object is non-transparent, due to obstruction of the touch object, light emit by the sub-pixel 12 away from the geometric center C of the touch region A1 is more likely to be observed by the human eyes than light emit by the sub-pixel 12 close to the geometric center C of the touch region A1. In the embodiment of the present disclosure, by controlling the voltage difference corresponding to the first sub-pixel 12_1 closer to the geometric center C of the touch region A1 to be less than the voltage difference corresponding to the second sub-pixel 12_2, while the lower actual display brightness of the second sub-pixel 12_2 is achieved to reduce power consumption of the second sub-pixel 12_2, the actual display brightness of the first sub-pixel 12_1 cannot be too lower, and the first sub-pixel 12_1 can be in smooth transition with a display picture of the non-touch region at the periphery of the touch region A1, thereby improving a display effect of the touch display panel 1.

Optionally, along a direction from an edge of the touch region A1 to the geometric center C, the voltage differences $\Delta V$ corresponding to different sub-pixels 12 are increased gradually in the embodiment of the present disclosure, such that the actual display brightness $L_{11}$ of the sub-pixel 12 close to the edge of the touch region A1 is reduced less relative to the standard display brightness $L_{21}$, and the actual display brightness $L_{11}$ of the sub-pixel 12 close to the geometric center C of the touch region A1 is reduced more relative to the standard display brightness $L_{21}$. While the display driving power consumption in the touch region A1 is reduced, the brightness in the touch region A1 and the brightness in the non-touch region at the periphery of the touch region A1 change more gently, thereby improving the display effect of the touch display panel.

It is to be noted that the shape of the touch region A1 in FIG. 5 is merely for schematic illustration. The touch region A1 may be designed as a polygon or other irregular shapes in the embodiment of the present disclosure. The shape of the touch region A1 is not defined in the embodiment of the present disclosure.

Figure 6:
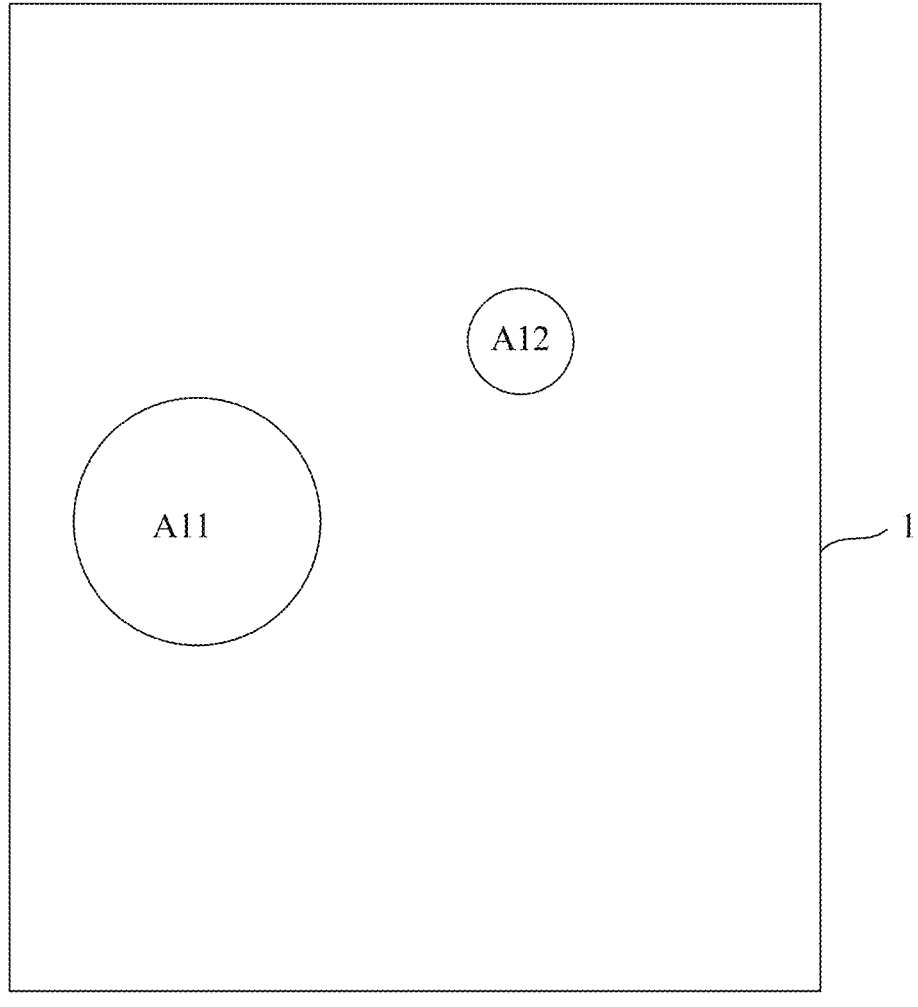
FIG. 6 illustrates a distribution of a first touch region and a second touch region in a touch display panel according to an embodiment of the present disclosure.

Optionally, the touch display panel 1 may support multi-touch for a plurality of touch regions A1. FIG. 6 illustrates a distribution of a first touch region and a second touch region in a touch display panel 1 according to an embodiment of the present disclosure. As shown in FIG. 6, the touch region A1 includes a first touch region A11 and a second touch region A12. An area of the first touch region A11 is greater than an area of the second touch region A12. The image data includes first image data corresponding to the first touch region A11 and second image data corresponding to the second touch region A12.

A first brightness difference $\Delta L_1$ exists between actual display brightness $L_{111}$ of the first touch region A11 and first standard display brightness $L_{211}$ corresponding to the first image data, namely $\Delta L_1 = L_{211} - L_{111}$.

A second brightness difference $\Delta L_2$ exists between actual display brightness $L_{112}$ of the second touch region A12 and second standard display brightness $L_{212}$ corresponding to the second image data, namely $\Delta L_2 = L_{212} - L_{112}$.

That the actual display brightness $L_1$ of the touch region A1 is adjusted in the step S3 includes: The first brightness difference $\Delta L_1$ is adjusted be greater than the second brightness difference $\Delta L_2$.

Since the first touch region A11 has the larger area in the display region AA, when the touch display panel 1 is lighted up, more power consumption is required to light up the sub-pixel in the first touch region A11 correspondingly. In the embodiment of the present disclosure, by adjusting the first brightness difference $\Delta L_1$ to be greater than the second brightness difference $\Delta L_2$, the first touch region A11 with the larger area can display at lower brightness. This can minimize the power consumption of the first touch region A11, thereby reducing the overall display driving power consumption of the touch display panel 1.

Figure 7:
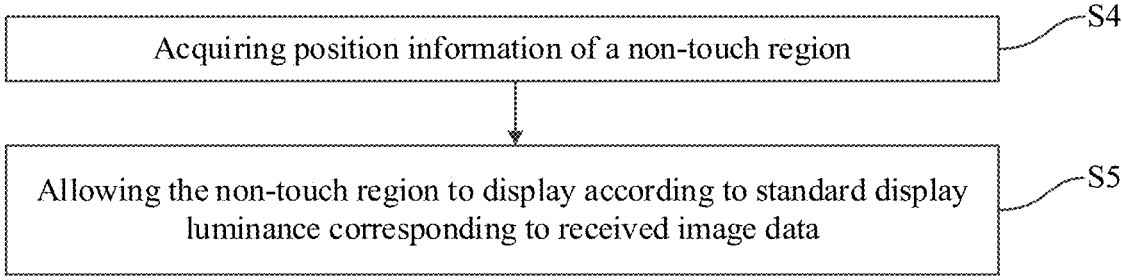
FIG. 7 illustrates a flowchart of another display driving method for a touch display panel according to an embodiment of the present disclosure.

FIG. 7 illustrates a flowchart of another display driving method for a touch display panel according to an embodiment of the present disclosure. Exemplarily, as shown in FIG. 7, the display driving method further includes:

In step S4, position information of a non-touch region A2 is acquired. The non-touch region A2 is a region where the touch operation does not occur in the display region AA of the touch display panel 1. A region other than the touch region A1 in the display region AA is the non-touch region A2. Optionally, the position information of the non-touch region A2 may be acquired synchronously with the position information of the touch region A1 in the step S1.

In step S5, the non-touch region A2 displays according to standard display brightness $L_{22}$ corresponding to received image data.

In this way, while the actual display brightness $L_{11}$ of the touch region A1 is reduced to reduce the power consumption of the touch display panel 1, it is ensured that the non-touch region A2 displays according to the standard display brightness $L_{22}$, and the display effect of the touch display panel 1 cannot be affected.

Optionally, according to the image data of one display picture, the standard display brightness $L_{22}$ corresponding to the non-touch region A2 is the same as standard display brightness $L_{21}$ corresponding to the touch region A1. That is, the picture to be displayed has same brightness. That the actual display brightness Ln of the touch region A1 is adjusted according to the position information of the touch region A1 and the image data in the step S3 includes: The actual display brightness $L_{11}$ of the touch region A1 is adjusted to be less than actual display brightness $L_{12}$ of the non-touch region A2, so as to reduce the power consumption of the touch region A1 of the touch display panel 1.

Figure 8:
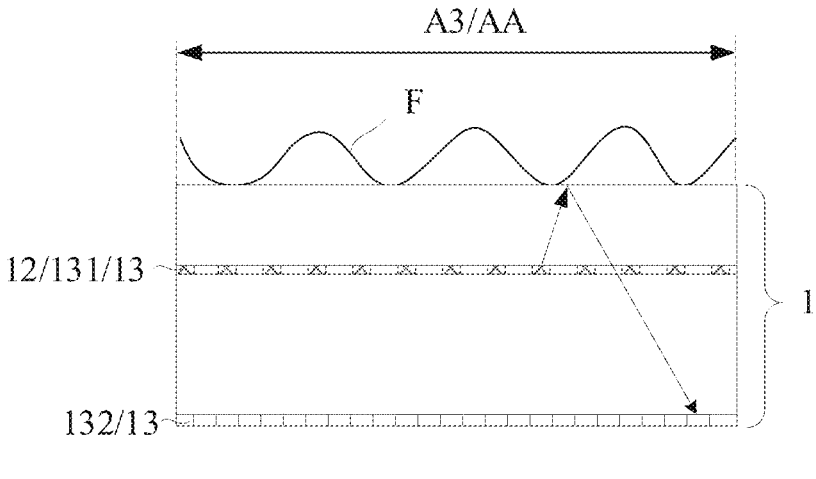
FIG. 8 is a schematic sectional view of a touch display panel including a fingerprint identification unit according to an embodiment of the present disclosure.

Optionally, in the embodiment of the present disclosure, the touch display panel 1 may further have a fingerprint identification function. FIG. 8 is a schematic sectional view of a touch display panel including a fingerprint identification unit according to an embodiment of the present disclosure. As shown in FIG. 8, the touch display panel 1 further includes a fingerprint identification unit 13. Exemplarily, the fingerprint identification unit 13 includes a fingerprint identification light source 131 and light sensing units 132.

In response to fingerprint identification, a finger F presses a touch surface of the touch display panel 1. Light emit by the fingerprint identification light source 131 is projected to the finger F and reflected. Reflected light is projected to the light sensing units 132. According to an intensity of the reflected light, a valley and a ridge of a fingerprint can be identified, thereby realizing the fingerprint identification. Optionally, the fingerprint identification light source 131 includes the sub-pixel 12.

Optionally, as shown in FIG. 8, the touch display panel 1 includes a fingerprint identification region A3. The fingerprint identification region A3 includes the light sensing units 132. Exemplarily, the fingerprint identification region A3 at least partially overlaps with the display region AA. For example, the light sensing units 132 may be uniformly provided in at least a part of the display region AA.

Figure 9:
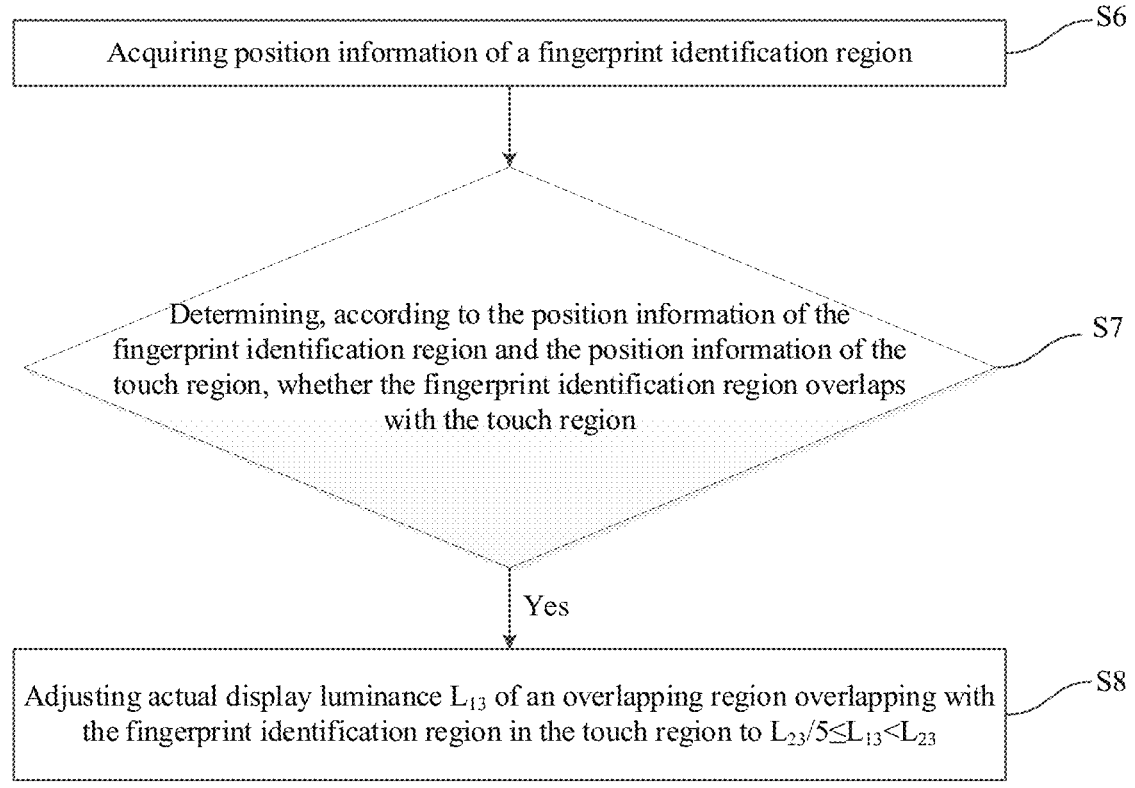
FIG. 9 illustrates a flowchart of still another display driving method for a touch display panel according to an embodiment of the present disclosure.

FIG. 9 illustrates a flowchart of still another display driving method for a touch display panel according to an embodiment of the present disclosure. Exemplarily, as shown in FIG. 9, the display driving method further includes:

In step S6, position information of the fingerprint identification region A3 is acquired. The position information may be determined through a position of the light sensing unit 132 in a plane of the touch display panel 1, and the light sensing unit 132 has a changed electrical signal.

In step S7, according to the position information of the fingerprint identification region A3 and the position information of the touch region A1, whether the fingerprint identification region A3 overlaps with the touch region A1 is determined.

Figure 10:
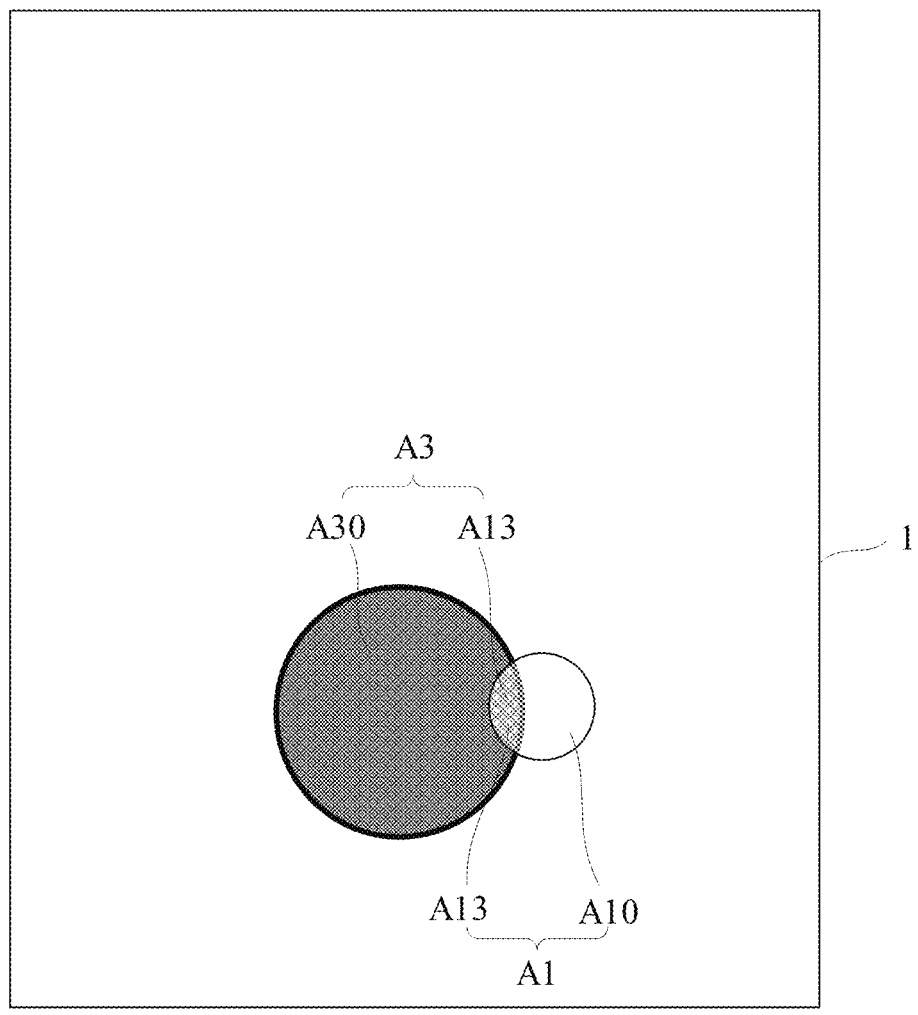
FIG. 10 illustrates a distribution of a touch region and a fingerprint identification region in a touch display panel according to an embodiment of the present disclosure.

FIG. 10 illustrates a distribution of a touch region A1 and a fingerprint identification region A3 in a touch display panel 1 according to an embodiment of the present disclosure. As shown in FIG. 10, the fingerprint identification region A3 overlaps with the touch region A1, with an overlapping region therebetween labeled as A13. If it is determined that the fingerprint identification region A3 overlaps with the touch region A1 in the step S7, actual display brightness $L_{13}$ of the overlapping region A13 is adjusted to $L_{23}/5 \leq L_{13} < L_{23}$. $L_{23}$ is standard display brightness corresponding to image data received by the overlapping region A13. Based on this manner, by adjusting $L_{13} < L_{23}$, the actual display brightness $L_{13}$ of the overlapping region A13 can be reduced, thereby reducing the display driving power consumption. On the other hand, by adjusting $L_{13} \geq L_{23}/5$, the actual display brightness $L_{13}$ of the overlapping region A13 cannot be too low, and an intensity of light projected to the finger for fingerprint identification can be ensured, thereby ensuring an accuracy of the fingerprint identification in the fingerprint identification region A3.

If it is determined that the fingerprint identification region A3 does not overlap with the touch region A1 in the step S7, the fingerprint identification region A3 displays according to the standard display brightness corresponding to the received image data, so as to ensure an intensity of light projected to the finger for fingerprint identification, thereby ensuring an accuracy of the fingerprint identification in the fingerprint identification region A3. The touch region A1 displays according to actual display brightness less than the standard display brightness corresponding to the received image data, so as to reduce display power consumption of the touch region A1.

Exemplarily, the display driving method provided by the embodiment of the present disclosure further includes:

It is determined whether the fingerprint identification region A3 includes a first non-overlapping region which does not overlap with the touch region A1.

If yes, the first non-overlapping region displays according to standard display brightness corresponding to received image data.

And/or,

It is determined whether the touch region A1 includes a second non-overlapping region which does not overlap with the fingerprint identification region A3.

If yes, actual display brightness $L_3$ of the second non-overlapping region is adjusted to satisfy $0 \leq L_3 < L_4$. $L_4$ is standard display brightness corresponding to image data received by the second non-overlapping region.

Exemplarily, FIG. 10 schematically illustrates that the fingerprint identification region A3 includes the first non-overlapping region A30, and the touch region A1 includes the second non-overlapping region A10. The first non-overlapping region A30 refers to a region not overlapping with the touch region A1 in the fingerprint identification region A3. In response to the display driving on the touch display panel 1, the actual display brightness of the first non-overlapping region A30 is the standard display brightness corresponding to the image data received by the region, so as to ensure an intensity of light required by the fingerprint identification, and improving an accuracy of the fingerprint identification. The second non-overlapping region A10 refers to a region not overlapping with the fingerprint identification region A3 in the touch region A1. In response to the display driving on the touch display panel 1, the actual display brightness $L_3$ of the second non-overlapping region A10 satisfies $0 \leq L_3 < L_4$, so as to reduce the display driving power consumption of the second overlapping region A10.

Figure 11:
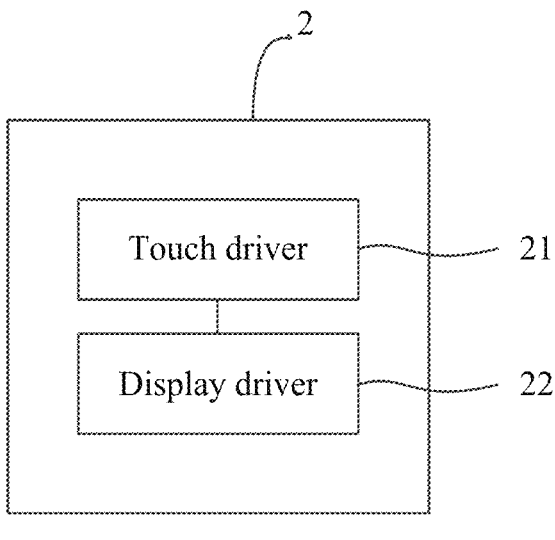
FIG. 11 is a schematic view of a display driving module according to an embodiment of the present disclosure.

An embodiment of the present disclosure further provides a display driving module for a touch display panel 1. FIG. 11 is a schematic view of a display driving module according to an embodiment of the present disclosure. As shown in FIG. 11, the display driving module 2 includes a touch driver 21 and a display driver 22.

Referring to FIG. 1 and FIG. 11, the touch driver 21 is configured to acquire position information of a touch region A1 according to a touch operation. Optionally, as shown in FIG. 3, the touch display panel 1 includes a touch electrode 11. The touch electrode 11 can generate a touch signal in response to the touch operation. The touch operation acts on the touch region A1. Exemplarily, the touch driver 21 is electrically connected to the touch electrode 11.

The display driver 22 is configured to receive image data, and adjust actual display brightness $L_{11}$ of the touch region A1 according to the position information of the touch region A1 and the image data.

Exemplarily, in the embodiment of the present disclosure, the touch driver 21 is further electrically connected to the display driver 22, such that the touch driver 21 sends the position information of the touch region A1 to the display driver 22.

In response to display driving on the touch display panel 1, the touch driver 21 acquires the position information of the touch region A1 according to the touch operation, and sends the position information to the display driver 22. Then the display driver 22 adjusts the actual display brightness $L_{11}$ of the touch region A1 according to received image data and the position information of the touch region A1.

The display driving module 2 provided by the embodiment of the present disclosure can associate actual display brightness of a display region AA not only with received image data, but also with whether the touch operation occurs in the region at present, and it is conducive to improve display performance of the touch display panel.

In a related art, in response to display driving on the touch display panel 1, the display driving is performed only according to image data received by the display region AA, without considering whether a touch operation occurs in the display region AA at present. Generally, in actual application, the touch object is non-transparent. Hence, in response to the touch operation on the touch display panel 1, the touch region A1 is obstructed by the touch object, such that light emit from the sub-pixels in the touch region A1 is obstructed by the touch object. In other words, in response to the touch operation on the touch display panel, a display picture of the touch region A1 is an unnecessary display region unperceived by the user. Therefore, in the embodiment of the present disclosure, the actual display brightness $L_{11}$ of the touch region A1 may be reduced relative to the standard display brightness $L_{21}$. Compared with a case where the actual display brightness of the touch region A1 is not reduced, not only can the display picture of the touch display panel 1 perceived by the user not be affected, but also the display power consumption of the touch region A1 can be reduced, thereby making the touch display panel 1 more competitive.

Alternatively, in other application scenarios, for example, under the case that the touch object has a certain light transmittance, the actual display brightness $L_{11}$ of the touch region A1 may be increased relative to the standard display brightness $L_{21}$ in the embodiment of the present disclosure. When the user performs a touch operation on the touch display panel 1 and observes a display picture of the touch display panel 1, due to the larger actual display brightness $L_{11}$ of the touch region A1 where the touch operation occurs, after light emit by the pixel units in the touch region A1 passes through the touch object, an intensity of light of the touch region A1 entering eyes of the user is the same as an intensity of light emit by the pixel units in the non-touch region A2 where the touch operation does not occur. A region out of the touch region A1 in the display region AA is called the non-touch region A2. That is, an influence of obstruction of the touch object on the display brightness in the touch region A1 can be compensated, such that the brightness of the touch region A1 observed by the user is the same as the brightness of the non-touch region A2 where the touch operation does not occur. This makes the touch display panel display more uniformly.

Optionally, the touch driver 21 and the display driver 22 may use an independent integrated circuit (IC). Alternatively, both the touch driver and the display driver may also be integrated into one IC.

Figure 12:
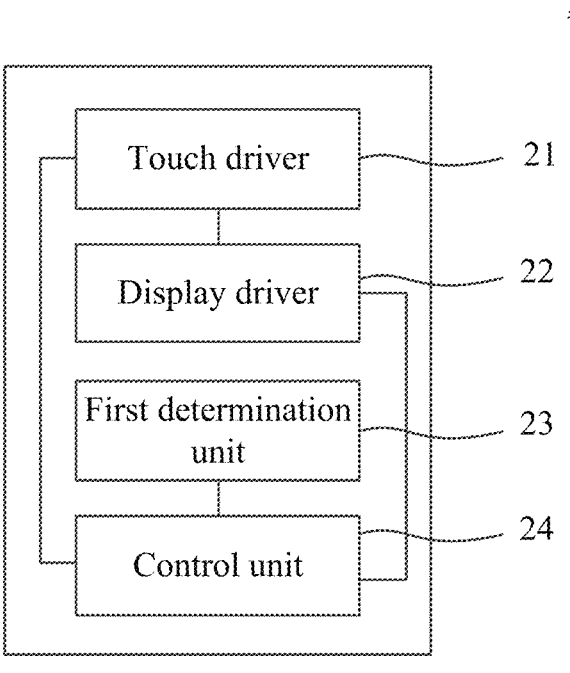
FIG. 12 is a schematic view of another display driving module according to an embodiment of the present disclosure.

FIG. 12 is a schematic view of another display driving module according to an embodiment of the present disclosure. Optionally, as shown in FIG. 12, the display driving module 2 further includes a first determination unit 23 and a control unit 24 that are electrically connected. Exemplarily, the first determination unit 23 is electrically connected to the control unit 24. The control unit 24 is electrically connected to the touch driver 21 and the display driver 22.

The first determination unit 23 is configured to determine, prior to acquiring the position information of the touch region A1, whether the touch operation occurs on the touch display panel 1. Exemplarily, the first determination unit 23 may acquire a signal from the touch electrode 11 in real time, and determine, according to the signal from the touch electrode 11, whether the touch operation occurs.

If yes, the control unit 24 controls the touch driver 21 to acquire the position information of the touch region A1. The touch driver 21 sends the acquired position information of the touch region A1 to the display driver 22. The display driver 22 may adjust the actual display brightness $L_{11}$ of the touch region A1 according to the position information of the touch region A1 and the image data.

If no, the control unit 24 controls the display driver 22, thereby displaying by the touch display panel 1 according to standard display brightness $L_2$ corresponding to received image data, and ensuring that the display effect of the touch display panel 1 is not affected.

Exemplarily, the actual display brightness Lu is less than the standard display brightness $L_{21}$. When the touch object is non-transparent, the actual display brightness $L_{11}$ of the touch region A1 is reduced relative to the standard display brightness $L_{21}$ in the embodiment of the present disclosure. Compared with a case where the actual display brightness of the touch region A1 is not reduced, not only can the display picture of the touch display panel 1 perceived by the user not be affected, but also the display power consumption of the touch region A1 can be reduced, thereby making the touch display panel 1 more competitive.

Optionally, the touch region A1 may be provided as a black picture in the embodiment of the present disclosure, so as to minimize driving power consumption of the touch display panel 1.

Exemplarily, the first determination unit 23 and the control unit 24 may use an independent IC. Alternatively, both the first determination unit 23 and the control unit 24 may also be integrated into the same IC.

Optionally, the first determination unit 23 may be integrated with the touch driver 21 and/or the display driver 22 into the same IC. And/or, the control unit 24 may be integrated with the touch driver 21 and/or the display driver 22 into the same IC.

Optionally, as shown in FIG. 4, the sub-pixel 12 includes a pixel driver circuit 121 and a light emitting component 122 that are electrically connected. The pixel driver circuit 121 includes a data writing terminal Vdata. The data writing terminal Vdata is configured to write a data voltage.

Exemplarily, the display driver 22 includes a data driver circuit. The data driver circuit is configured to adjust a data voltage received by the data writing terminal Vdata of the pixel driver circuit 121 in the touch region A1 to an actual data voltage $V_1$. The actual data voltage $V_1$ is not equal to a standard data voltage $V_2$ corresponding to the image data. A current flowing through the light emitting component is associated with the data voltage, and the current flowing through the light emitting component affects brightness of the light emitting component. By adjusting the data voltage received by the pixel driver circuit 121 with the data driver circuit in the embodiment of the present disclosure, the actual data voltage $V_1$ received by the data writing terminal Vdata is not equal to the standard data voltage $V_2$ corresponding to the image data. This is simple and easily achievable. While the data voltage in the touch region A1 is adjusted, a data voltage received by the pixel driver circuit 121 in the non-touch region A2 cannot be affected, which ensuring that the non-touch region A2 can display according to the standard display brightness.

Optionally, a voltage difference $\Delta V$ exists between the actual data voltage $V_1$ and the standard data voltage $V_2$, namely $\Delta V = V_2 - V_1$. As shown in FIG. 5, the touch region A1 includes a plurality of sub-pixels 12. The plurality of sub-pixels 12 are arranged in an array along a first direction h1 and a second direction h2. In the embodiment of the present disclosure, as shown in FIG. 5, the plurality of sub-pixels 12 include a first sub-pixel 12_1 and a second sub-pixel 12_2. A distance from the first sub-pixel 12_1 to a geometric center C of the touch region A1 is greater than a distance from the second sub-pixel 12_2 to the geometric center C of the touch region A1.

That the data driver circuit 221 adjusts the data voltage in the touch region A1 to the actual data voltage $V_1$ includes: A voltage difference corresponding to the first sub-pixel 12_1 is controlled to be less than a voltage difference corresponding to the second sub-pixel 12_2. The voltage difference corresponding to the sub-pixel 12 refers to the voltage difference between the actual data voltage $V_1$ received by the sub-pixel 12 and the standard data voltage $V_2$.

In the embodiment of the present disclosure, when the touch object is non-transparent, due to obstruction of the touch object, light emit by the sub-pixel 12 away from the geometric center C of the touch region A1 is more likely to be observed by the human eyes than light emit by the sub-pixel 12 close to the geometric center C of the touch region A1. In the embodiment of the present disclosure, by controlling the voltage difference corresponding to the first sub-pixel 12_1 to be less than the voltage difference corresponding to the second sub-pixel 12_2, the actual display brightness of the first sub-pixel 12_1 away from the geometric center C of the touch region A1 is reduced less relative to the standard display brightness, and the actual display brightness of the second sub-pixel 12_2 close to the geometric center C of the touch region A1 is reduced more relative to the standard display brightness. While the power consumption of the second sub-pixel 12_2 is reduced, the actual display brightness of the first sub-pixel 12_1 cannot be too lower, and the first sub-pixel 12_1 can be in smooth transition with a display picture of the non-touch region at the periphery of the touch region A1, thereby improving a display effect of the touch display panel 1.

Exemplarily, in the embodiment of the present disclosure, along a direction from an edge of the touch region A1 to the geometric center C, the data driving circuit 221 controls the voltage differences $\Delta V$ corresponding to different sub-pixels 12 to increase gradually, such that the actual display brightness $L_{11}$ of the sub-pixel 12 close to the edge of the touch region A1 is reduced less relative to the standard display brightness $L_{21}$, and the actual display brightness $L_{11}$ of the sub-pixel 12 close to the geometric center C of the touch region A1 is reduced more relative to the standard display brightness $L_{21}$. While the display driving power consumption in the touch region A1 is reduced, the brightness in the touch region A1 and the brightness in the non-touch region at the periphery of the touch region A1 change more gently, thereby improving the display effect of the touch display panel.

Exemplarily, as shown in FIG. 6, the touch region A1 includes a first touch region A11 and a second touch region A12. An area of the first touch region A11 is greater than an area of the second touch region A12. The image data includes first image data corresponding to the first touch region A11 and second image data corresponding to the second touch region A12.

A first brightness difference $\Delta L_1$ exists between actual display brightness $L_{111}$ of the first touch region A11 and first standard display brightness $L_{211}$ corresponding to the first image data, namely $\Delta L_1 = L_{211} - L_{111}$.

A second brightness difference $\Delta L_2$ exists between actual display brightness $L_{112}$ of the second touch region A12 and second standard display brightness $L_{212}$ corresponding to the second image data, namely $\Delta L_2 = L_{212} - L_{112}$.

That the display driver 22 adjusts the actual display brightness $L_1$ of the touch region A1 includes: The display driver 22 controls the first brightness difference $\Delta L_1$ to be greater than the second brightness difference $\Delta L_2$.

Since the first touch region A11 has the larger area in the display region AA, when the touch display panel 1 is lighted up, more power consumption is required to light up the sub-pixel in the first touch region A11 correspondingly. In the embodiment of the present disclosure, by adjusting the first brightness difference $\Delta L_1$ to be greater than the second brightness difference $\Delta L_2$, the first touch region A11 with the larger area can display at lower brightness. This can minimize the power consumption of the first touch region A11, thereby reducing the overall display driving power consumption of the touch display panel 1, and making the touch display panel 1 more competitive.

Exemplarily, referring to FIG. 1 and FIG. 11, the touch driver 21 is further configured to acquire position information of a non-touch region A2. The non-touch region A2 is a region where the touch operation does not occur on the touch display panel 1. The display driver 22 is further configured to display according to the position information of the non-touch region A2 and the image data, according to standard display brightness $L_{22}$ corresponding to the image data. In this way, while the actual display brightness $L_{11}$ of the touch region A1 is reduced to reduce the power consumption of the touch display panel 1, it is ensured that the non-touch region A2 displays according to the standard display brightness $L_{22}$, and the display effect of the touch display panel 1 cannot be affected.

Exemplarily, according to the image data, the standard display brightness $L_{22}$ corresponding to the non-touch region A2 is the same as standard display brightness $L_{21}$ corresponding to the touch region A1. That is, the picture to be displayed has same brightness. That the display driver 22 adjusts the actual display brightness $L_{11}$ of the touch region A1 includes:

The display driver 22 adjusts the actual display brightness $L_{11}$ of the touch region A1 to be less than actual display brightness $L_{12}$ of the non-touch region A2, so as to reduce the display driving power consumption of the touch display panel 1.

Exemplarily, in the embodiment of the present disclosure, the touch display panel 1 may further have a fingerprint identification function. As shown in FIG. 8, the touch display panel 1 further includes a fingerprint identification unit 13. Exemplarily, the fingerprint identification unit 13 includes a fingerprint identification light source 131 and light sensing units 132. Optionally, the fingerprint identification light source 131 includes the sub-pixel 12. In response to fingerprint identification, a finger F presses a touch surface of the touch display panel 1. Light emit by the fingerprint identification light source 131 is projected to the finger and reflected. Reflected light is projected to the light sensing units 132. According to an intensity of the reflected light, a valley and a ridge of a fingerprint can be identified, thereby realizing the fingerprint identification.

Optionally, as shown in FIG. 8, the touch display panel 1 includes a fingerprint identification region A3. The fingerprint identification region A3 includes the light sensing units 132. Exemplarily, the fingerprint identification region A3 at least partially overlaps with the display region AA. For example, the light sensing units 132 may be uniformly provided in at least a part of the display region AA.

Figure 13:
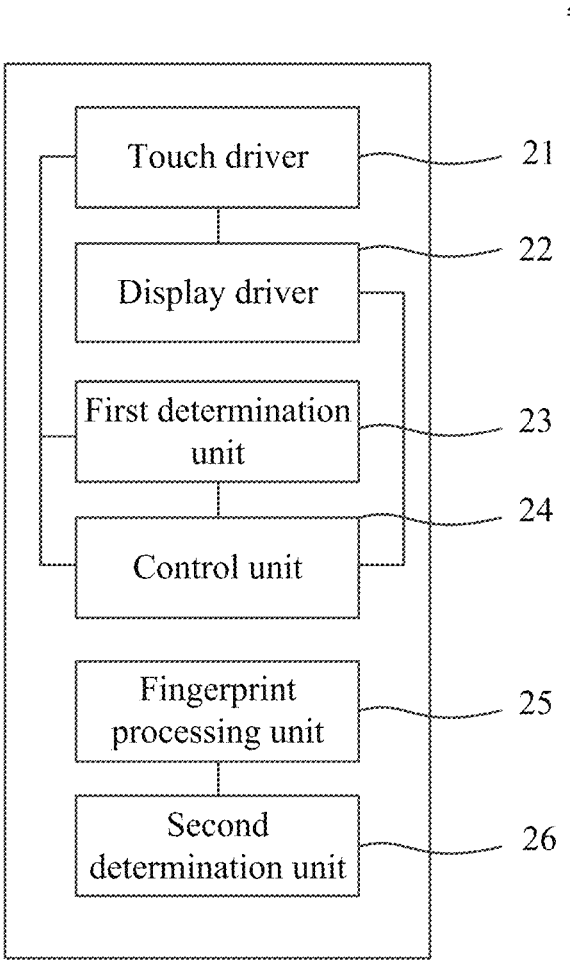
FIG. 13 is a schematic view of still another display driving module according to an embodiment of the present disclosure.

FIG. 13 is a schematic view of still another display driving module 2 according to an embodiment of the present disclosure. Optionally, as shown in FIG. 13, the display driving module 2 further includes a fingerprint processing unit 25 and a second determination unit 26. The fingerprint processing unit 25 is electrically connected to the second determination unit 26. The fingerprint processing unit 25 is configured to acquire position information of a fingerprint identification region A3, and send the position information to the second determination unit 26. The second determination unit 26 is configured to determine, according to the position information of the fingerprint identification region A3 and the position information of the touch region A1, whether the fingerprint identification region A3 overlaps with the touch region A1.

If yes, referring to FIG. 10, an overlapping region between the fingerprint identification region A3 and the touch region A1 is labeled as A13. The display driver 22 adjusts actual display brightness $L_{13}$ of the overlapping region A13 to $L_{23}/5 \leq L_{13} < L_{23}$. $L_{23}$ is standard display brightness corresponding to image data received by the overlapping region A13. Based on this manner, by adjusting $L_{13} < L_{23}$, the actual display brightness $L_{13}$ of the overlapping region A13 can be reduced, thereby reducing the display driving power consumption. On the other hand, by adjusting $L_{13} \geq L_{23}/5$, the actual display brightness $L_{13}$ of the overlapping region A13 cannot be too low, and an intensity of light projected to the finger for fingerprint identification can be ensured, thereby ensuring an accuracy of the fingerprint identification in the fingerprint identification region A3.

If no, the fingerprint identification region A3 displays according to standard display brightness corresponding to received image data.

Exemplarily, the fingerprint processing unit 25 and the second determination unit 26 may use an independent IC. Alternatively, both the fingerprint processing unit 25 and the second determination unit 26 may also be integrated into the same IC.

Optionally, the fingerprint processing unit 25 may be integrated with the touch driver 21 and/or the display driver 22 into the same IC. And/or, the second determination unit 26 may be integrated with the touch driver 21 and/or the display driver 22 into the same IC.

Exemplarily, the display driving module 2 further includes a third determination unit. The third determination unit is configured to determine whether the fingerprint identification region A3 includes a first non-overlapping region not overlapping with the touch region A1. If yes, the display driver 22 displays by the first non-overlapping region according to standard display brightness corresponding to received image data. And/or, the display driving module 2 further includes a fourth determination unit. The fourth determination unit is configured to determine whether the touch region A1 includes a second non-overlapping region not overlapping with the fingerprint identification region A3. If yes, the display driver 22 adjusts actual display brightness $L_3$ of the second non-overlapping region to satisfy $0 \leq L_3 < L_4$. $L_4$ is standard display brightness corresponding to image data received by the second non-overlapping region.

FIG. 10 schematically illustrates that the fingerprint identification region A3 includes the first non-overlapping region A30, and the touch region A1 includes the second non-overlapping region A10. The first non-overlapping region A30 refers to a region not overlapping with the touch region A1 in the fingerprint identification region A3. In response to the display driving on the touch display panel 1, through the display driver 22, the actual display brightness of the first non-overlapping region A30 is the standard display brightness corresponding to the image data received by the region. The second non-overlapping region A10 refers to a region not overlapping with the fingerprint identification region A3 in the touch region A1. In response to the display driving on the touch display panel 1, through the display driver 22, the actual display brightness $L_3$ of the second non-overlapping region A10 satisfies $0 \leq L_3 < L_4$, so as to reduce the display driving power consumption of the second overlapping region A10.

Exemplarily, the third determination unit may use an independent IC. Alternatively, the third determination unit may be integrated with the touch driver 21 and/or the display driver 22 into the same IC.

Figure 14:
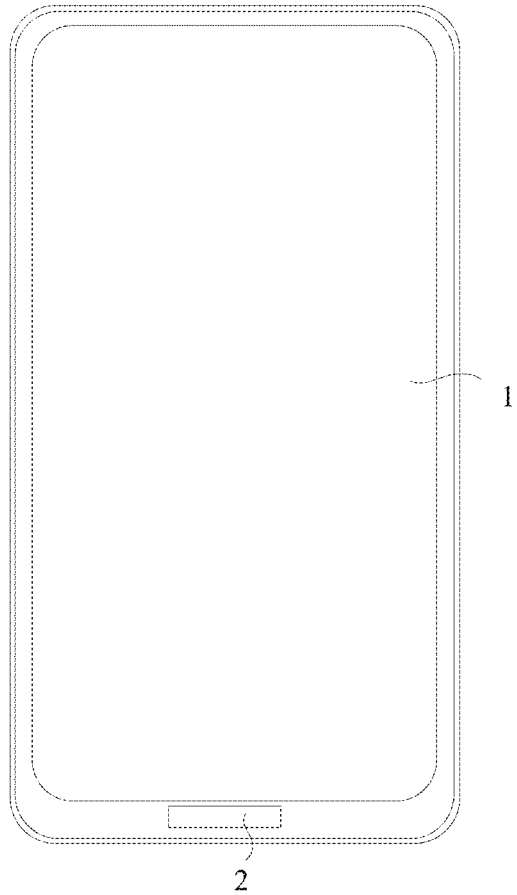
FIG. 14 is a schematic view of a touch display apparatus according to an embodiment of the present disclosure.

An embodiment the present disclosure further provides a touch display apparatus. FIG. 14 is a schematic view of a touch display apparatus according to an embodiment of the present disclosure. As shown in FIG. 14, the touch display apparatus includes a touch display panel 1 and the display driving module 2. The display driving module 2 is electrically connected to the touch display panel 1. A specific structure of the display driving module 2 has been described in detail in the foregoing embodiments. Details are not repeated herein. Certainly, the touch display apparatus in FIG. 14 is merely for schematic illustration. The touch display apparatus may be any electronic device with a display function, such as a mobile phone, a tablet computer, a notebook computer, an ebook, or a television.

The above descriptions are merely preferred embodiments of the present disclosure, and are not intended to limit the present disclosure. Any modifications, equivalent replacements, improvements, and the like made within the spirit and principle of the present disclosure shall fall within the protection scope of the present disclosure.

What is claimed is:

1. A display driving method for a touch display panel, comprising:

acquiring position information of a touch region according to a touch operation, the touch operation acting on the touch region;

receiving image data; and adjusting actual display brightness of the touch region according to the position information of the touch region and the image data, wherein the touch region comprises a first touch region and a second touch region; and an area of the first touch region is greater than an area of the second touch region;

the image data comprises first image data corresponding to the first touch region and second image data corresponding to the second touch region;

a first brightness difference exists between actual display brightness of the first touch region and first standard display brightness corresponding to the first image data; and a second brightness difference exists between actual display brightness of the second touch region and second standard display brightness corresponding to the second image data; and the adjusting the actual display brightness of the touch region comprises:

adjusting the first brightness difference to be greater than the second brightness difference.

2. The display driving method according to claim 1, wherein prior to the acquiring the position information of the touch region, the display driving method further comprises:

determining whether the touch operation occurs on the touch display panel;

if yes, acquiring the position information of the touch region; and if no, displaying, by the touch display panel, according to standard display brightness corresponding to received image data.

3. The display driving method according to claim 2, wherein the actual display brightness is less than the standard display brightness.

4. The display driving method according to claim 1, wherein the touch display panel comprises a pixel driver circuit; the pixel driver circuit comprises a data writing terminal configured to write a data voltage; and the adjusting the actual display brightness of the touch region comprises:

adjusting a data voltage of the touch region to an actual data voltage, the actual data voltage being not equal to a standard data voltage corresponding to the image data.

5. The display driving method according to claim 4, wherein a voltage difference exists between the actual data voltage and the standard data voltage;

the touch region comprises a plurality of sub-pixels arranged along a direction from an edge of the touch region to a center of the touch region; and the adjusting the data voltage in the touch region to the actual data voltage comprises:

controlling, along the direction from the edge of the touch region to the center, voltage differences corresponding to the sub-pixels to increase.

6. The display driving method according to claim 1, further comprising:

acquiring position information of a non-touch region, the non-touch region being a region where the touch operation does not occur on the touch display panel; and displaying, by the non-touch region, according to standard display brightness corresponding to received image data.

7. The display driving method according to claim 6, wherein based on the image data, the standard display brightness corresponding to the non-touch region is the same as standard display brightness corresponding to the touch region; and the adjusting the actual display brightness of the touch region according to the position information of the touch region and the image data comprises:

adjusting the actual display brightness of the touch region to be less than actual display brightness of the non-touch region.

8. The display driving method according to claim 1, further comprising:

acquiring position information of a fingerprint identification region;

determining, according to the position information of the fingerprint identification region and the position information of the touch region, whether the fingerprint identification region overlaps with the touch region; and if yes, adjusting actual display brightness $L_{13}$ of an overlapping region to $L_{23}/5 \leq L_{13} < L_{23}$, wherein $L_{23}$ is standard display brightness corresponding to image data received by the overlapping region.

9. The display driving method according to claim 8, further comprising:

determining whether the fingerprint identification region comprises a first non-overlapping region not overlapping with the touch region; and if yes, displaying by the first non-overlapping region according to standard display brightness corresponding to received image data;

and/or, determining whether the touch region comprises a second non-overlapping region not overlapping with the fingerprint identification region; and if yes, adjusting actual display brightness $L_3$ of the second non-overlapping region to satisfy $0 \leq L_3 < L_4$, wherein $L_4$ is standard display brightness corresponding to image data received by the second non-overlapping region.

10. A display driving module for a touch display panel, comprising:

a touch driver configured to acquire position information of a touch region according to a touch operation, wherein the touch operation acts on the touch region; and a display driver configured to receive image data and adjust actual display brightness of the touch region according to the position information of the touch region and the image data, wherein the touch region comprises a first touch region and a second touch region; and an area of the first touch region is greater than an area of the second touch region;

the image data comprises first image data corresponding to the first touch region and second image data corresponding to the second touch region;

a first brightness difference exists between actual display brightness of the first touch region and first standard display brightness corresponding to the first image data; and a second brightness difference exists between actual display brightness of the second touch region and second standard display brightness corresponding to the second image data; and the display driver is configured to:

control the first brightness difference to be greater than the second brightness difference.

11. The display driving module according to claim 10, further comprising:

a first determination unit configured to determine, prior to acquiring the position information of the touch region, whether the touch operation occurs on the touch display panel; and a control unit configured to, in response to a determination result of the first determination unit being yes, control the touch driver to acquire the position information of the touch region, and, in response to a determination result of the first determination unit being no, configured to control the display driver, thereby displaying by the touch display panel according to standard display brightness corresponding to received image data.

12. The display driving module according to claim 11, wherein the actual display brightness is less than the standard display brightness.

13. The display driving module according to claim 10, wherein the touch display panel comprises a pixel driver circuit; the pixel driver circuit comprises a data writing terminal configured to write a data voltage; and the display driver comprises a data driver circuit; the data driver circuit is configured to adjust a data voltage of the touch region to an actual data voltage; and the actual data voltage is not equal to a standard data voltage corresponding to the image data.

14. The display driving module according to claim 13, wherein a voltage difference exists between the actual data voltage and the standard data voltage;

the touch region comprises a plurality of sub-pixels arranged along a direction from an edge of the touch region to a center of the touch region; and the data driver circuit is configured to along the direction from the edge of the touch region to the center, control voltage differences corresponding to the sub-pixels to increase.

15. The display driving module according to claim 10, wherein the touch driver is further configured to acquire position information of a non-touch region, and the non-touch region is a region where the touch operation does not occur on the touch display panel; and the display driver is further configured to adjust, according to the position information of the non-touch region and the image data, the non-touch region to display according to standard display brightness corresponding to the image data.

16. The display driving module according to claim 15, wherein based on the image data, the standard display brightness corresponding to the non-touch region is the same as standard display brightness corresponding to the touch region; and the display driver is configured to:

adjust the actual display brightness of the touch region to be less than actual display brightness of the non-touch region.

17. The display driving module according to claim 10, further comprising a fingerprint processing unit configured to acquire position information of a fingerprint identification region; and a second determination unit configured to determine, according to the position information of the fingerprint identification region and the position information of the touch region, whether the fingerprint identification region overlaps with the touch region; and if yes, the display driver is further configured to adjust brightness $L_{13}$ of an overlapping region to $L_{23}/5 \leq L_{13} < L_{23}$, wherein $L_{23}$ is standard display brightness corresponding to image data received by the overlapping region.

18. A touch display apparatus, comprising:

a touch display panel; and a display driving module, comprising:

a touch driver configured to acquire position information of a touch region according to a touch operation, wherein the touch operation acts on the touch region; and a display driver configured to receive image data and adjust actual display brightness of the touch region according to the position information of the touch region and the image data, wherein the touch region comprises a first touch region and a second touch region; and an area of the first touch region is greater than an area of the second touch region;

the image data comprises first image data corresponding to the first touch region and second image data corresponding to the second touch region;

a first brightness difference exists between actual display brightness of the first touch region and first standard display brightness corresponding to the first image data; and a second brightness difference exists between actual display brightness of the second touch region and second standard display brightness corresponding to the second image data; and the display driver is configured to:

control the first brightness difference to be greater than the second brightness difference;

wherein the display driving module is electrically connected to the touch display panel.

* * * * *